United States Patent
Crump et al.

(10) Patent No.: US 10,745,812 B2
(45) Date of Patent: Aug. 18, 2020

(54) METHODS, SYSTEMS AND APPARATUSES FOR COPPER REMOVAL FROM ALUMINUM DESMUTTING SOLUTIONS

(71) Applicant: The Boeing Company, Chicago, IL (US)

(72) Inventors: David L. Crump, Seattle, WA (US); Lance E. Succo, Onalaska, WA (US); David Huebner, Lakeville, MN (US); Mark R. Woodruff, Sammamish, WA (US)

(73) Assignee: The Boeing Company, Chicago, IL (US)

(*) Notice: Subject to any disclaimer, the term of this patent is extended or adjusted under 35 U.S.C. 154(b) by 99 days.

(21) Appl. No.: 15/685,263

(22) Filed: Aug. 24, 2017

(65) Prior Publication Data
US 2019/0062928 A1 Feb. 28, 2019

(51) Int. Cl.
| | |
|---|---|
| *C23G 1/12* | (2006.01) |
| *C23F 1/46* | (2006.01) |
| *C23G 3/00* | (2006.01) |
| *B01D 61/18* | (2006.01) |
| *B01D 61/14* | (2006.01) |
| *C23G 3/02* | (2006.01) |

(Continued)

(52) U.S. Cl.
CPC .......... *C23G 1/125* (2013.01); *B01D 61/142* (2013.01); *B01D 61/18* (2013.01); *C23F 1/46* (2013.01); *C23G 1/103* (2013.01); *C23G 1/34* (2013.01); *C23G 1/36* (2013.01); *C23G 3/00* (2013.01); *C23G 3/021* (2013.01); *B01D 61/147* (2013.01); *C09K 13/04* (2013.01)

(58) Field of Classification Search
CPC . C23G 1/125; C23G 1/36; C23G 1/34; C23G 1/103; C23G 3/00; C23G 3/021; C23F 1/46; B01D 61/18; B01D 61/142; B01D 61/147; B01D 46/00; C09K 13/04
See application file for complete search history.

(56) References Cited

U.S. PATENT DOCUMENTS

| | | |
|---|---|---|
| 3,275,562 A | 9/1966 | Smith |
| 3,359,335 A | 12/1967 | Roming, Jr. |

(Continued)

FOREIGN PATENT DOCUMENTS

| | | | |
|---|---|---|---|
| DE | 102008062970 A1 * | 7/2010 | ............... C23G 1/36 |

OTHER PUBLICATIONS

Koenig—DE-102008062970 (original and translation attached) (Year: 2010).*

(Continued)

*Primary Examiner* — Liam Royce
(74) *Attorney, Agent, or Firm* — Coats & Bennett, PLLC

(57) ABSTRACT

Methods, systems and apparatuses are disclosed for treating aluminum desmutting solutions by reacting, mixing and filtering an aluminum desmutting solution flow from an aluminum desmutting solution tank and controlling the amount of copper ions in an aluminum desmutting solution tank by directing a portion of the desmutting solution from a desmutting solution tank to a treatment line, reacting a portion of the desmutting solution in the treatment line and recirculating a filtered aluminum desmutting solution to the aluminum desmutting solution tank during active desmutting operation of the aluminum desmutting solution tank.

20 Claims, 6 Drawing Sheets

(51) Int. Cl.
  *C23G 1/36* (2006.01)
  *C23G 1/34* (2006.01)
  *C23G 1/10* (2006.01)
  *C09K 13/04* (2006.01)

(56) References Cited

U.S. PATENT DOCUMENTS

| | | | | |
|---|---|---|---|---|
| 3,537,895 A | * | 11/1970 | Lancy | ............... C23G 1/02 |
| | | | | 134/3 |
| 3,549,540 A | | 12/1970 | Dollman et al. | |
| 3,634,291 A | | 1/1972 | Usami | |
| 6,171,409 B1 | * | 1/2001 | Hamacher | ............... C23C 22/73 |
| | | | | 118/410 |
| 6,407,047 B1 | | 6/2002 | Mehta et al. | |
| 2005/0178669 A1 | * | 8/2005 | Strubbe | ............... C23C 18/1653 |
| | | | | 205/185 |

OTHER PUBLICATIONS

Schuman TP. 2012. Protective Coatings for Aluminum Alloys (Metal Surface Pretreatment Excerpt). In: Andrew W. Handbook of Environmental Degradation of Materials. Elsevier Science & Technology Books. p. 508-518. (Year: 2012).*

* cited by examiner

METHODS, SYSTEMS AND APPARATUSES FOR COPPER REMOVAL FROM ALUMINUM DESMUTTING SOLUTIONS

TECHNOLOGICAL FIELD

The present disclosure relates generally to the field of treating aluminum and aluminum alloys. More specifically, the present disclosure relates to the field of deoxidizing and desmutting aluminum and methods and systems for treating aluminum desmutting solutions.

BACKGROUND

Aluminum and aluminum alloys are desirable manufacturing materials across many industries. When processing aluminum and aluminum alloys, care is taken to remove naturally occurring layers of oxidation (e.g. aluminum oxides) that develop on exposed aluminum and aluminum alloy surfaces. Such removal of aluminum oxide layers can desirably lower surface resistivity to, for example, facilitate welding, facilitate or enhance adherence of later-applied protective coatings, enhance anodizing or conversion coating, and/or facilitate other aluminum and/or aluminum alloy processing, etc.

Solutions used to dissolve or otherwise ameliorate the undesirable effects of oxidation on aluminum and aluminum alloy surfaces are referred to as deoxidizing solutions or cleaning solutions. Such deoxidizing solutions are typically strongly acidic, and not only remove the oxide layer, but also attack the base metal surface under the oxide layer to a certain extent. Since many aluminum alloys comprise copper, some of the copper will be dissolved along with the oxide layer. If the copper ion concentration is allowed to rise to, or above, certain levels, some of the copper may redeposit onto the aluminum workpiece being deoxidized. Such layers of redeposited copper are referred to as "smut".

Such smut layers must be removed via desmutting processes to obtain aluminum and aluminum alloy workpieces in desired processing condition, as copper smut interferes with further aluminum processing stages including, without limitation, uniform aluminum protective coatings, aluminum coatings applied to aluminum workpieces for purposes of improving adhesion of subsequent coatings and treatments, etc.

Various agents and processes are known for smut removal, also known as "desmutting" operations. However, when the smut is removed, the copper ions and compounds are retained in the deoxidizing solution used to desmut the aluminum, requiring the eventual replacement of large amounts of desmutting solution from desmutting tanks and cleaning of the tanks. For example, such desmutting tanks may contain from about 30,000 gallons to about 50,000 gallons, or more. Replacement of such amounts of desmutting solution with regularity is time-consuming and expensive, not only in terms of the cost of replenishing the solution, but also in terms of waste, storage, removal and other costs associated with changing out the desmutting solution. Further costs are realized with respect to environmental concerns, as well as the adverse production impact caused by processing lines being shut down or otherwise interrupted from days or weeks while old aluminum desmutting solution is removed and replenished with new aluminum desmutting solution.

SUMMARY

Aspects of the present disclosure are directed to methods of treating an aluminum desmutting tank containing a desmutting solution, methods of desmutting an aluminum workpiece, systems for treating an aluminum desmutting solution and desmutting tank, and systems for treating aluminum comprising such desmutting solution treatments.

According to an aspect, the present disclosure is directed to a method of treating an aluminum desmutting tank, with the method including directing at least a portion of an aluminum desmutting solution from the aluminum desmutting tank to a mixing section, directing an aqueous reagent solution from an aqueous reagent feed line to the mixing section, with the aqueous reagent solution including an iron cyanide compound (e.g., including, without limitation, an iron cyanide compound in the form of an iron cyanide salt). Copper ions present in the aluminum desmutting solution are contacted with the aqueous reagent solution at the mixing section to form a precipitate comprising at least one copper-containing compound. The precipitate is filtered to form a first filtered flow, and the first filtered flow is directed to a recirculating line, wherein the recirculating line returns the first filtered flow to the aluminum desmutting tank.

In another aspect, in the step of directing at least a portion of the aluminum deoxidizing solution, the aluminum desmutting tank is an operating aluminum desmutting tank.

In another aspect, in the step of directing at least a portion of the aluminum desmutting solution, the portion of the aluminum desmutting solution comprises a flow rate ranging from about 1 gallons/min. to about 50 gallons/min.

In a further aspect, in the step of directing an aqueous reagent solution, the iron cyanide compound includes one or more of a ferricyanide, a ferrocyanide, or a nitroprusside.

In another aspect, in the step of directing an aqueous reagent solution, the aqueous reagent solution includes one or more of potassium ferricyanide, a potassium ferrocyanide, sodium ferricyanide, or sodium ferrocyanide.

In another aspect, in the step of directing an aqueous reagent solution, the aqueous reagent solution comprises a reagent concentration ranging from about 5% by weight to about 25% by weight.

In another aspect, in the step of directing an aqueous reagent solution, the aqueous reagent solution comprises potassium ferricyanide in a concentration of about 20% by weight.

In a further aspect, in the step of contacting copper ions present in the aluminum desmutting solution with the aqueous reagent solution to form a precipitate, the aluminum desmutting solution is mixed with the aqueous reagent solution at an aqueous reagent solution mixing rate ranging from about 2 gallon per day to about 900 gallons per day of aqueous reagent solution combined with and added to the desmutting solution.

In a further aspect, after the step of filtering the precipitate to form a first filtered flow, an aspect further contemplates directing the first filtered flow from a first filter outlet to a filter inlet of a second filter, separating a further amount of precipitate in the second filter from the first filtered flow to form a second filtered flow, and directing the second filtered flow from a second filter outlet to the recirculating line.

In another aspect, in the step of separating a further amount of precipitate in the second filter to form a second filtered flow, the second filtered flow comprises a copper ion concentration ranging from about 30 ppm to about 100 ppm.

In another aspect, in the step of contacting copper ions present in the aluminum desmutting solution with the aqueous reagent solution at the mixing section, the mixing section includes at least one static mixing conduit, with the static mixing conduit comprising at least one baffle.

In a further aspect, the baffle is integral with an inner surface of the conduit.

In a further aspect, the mixing conduit comprises an insert, with the insert comprising at least one baffle.

A further aspect comprises reducing a copper ion concentration in the aluminum desmutting solution to a concentration ranging from about 100 ppm to about 475 ppm.

A further aspect of the disclosure is directed to a method of desmutting an aluminum workpiece, with the method including contacting the aluminum workpiece with an aluminum desmutting solution, directing at least a portion of an aluminum desmutting solution to a mixing section during substantially continuous operation of an aluminum desmutting process, directing a flow of an aqueous reagent solution to the mixing section, with the aqueous reagent solution including an iron cyanide-containing compound (e.g., including, without limitation, an iron cyanide salt). Copper ions present in the aluminum desmutting solution are contacted with the aqueous reagent solution at the mixing section to form a copper-containing precipitate. The copper-containing precipitate is filtered to form a filtered flow, and the filtered flow is directed to a recirculating line, wherein the recirculating line returns the filtered flow to the aluminum desmutting tank, with the copper ion concentration in the filtered flow ranging from about 30 ppm to about 100 ppm.

According to another aspect the iron cyanide-containing compound includes a ferricyanide, a ferrocyanide, or a nitroprusside.

In another aspect, the copper ion concentration in the aluminum desmutting solution is substantially maintained in a concentration ranging from about 300 ppm to about 475 ppm, with the aluminum desmutting operation in substantially continuous operation.

A further aspect of the present disclosure is directed to a system for treating an aluminum desmutting solution, with the system including an aluminum desmutting solution feed line in communication with an aluminum desmutting solution reservoir, with the aluminum desmutting solution feed line configured to deliver a portion of an aluminum desmutting solution from the aluminum desmutting solution reservoir to a recirculating line and an aluminum desmutting solution treatment line, with the aluminum desmutting solution treatment line in downstream communication with the recirculating line. The system further includes an aqueous reagent solution feed line in communication with an aqueous reagent solution from an aqueous solution source, with the aqueous reagent solution including one or more of a ferricyanide, a ferrocyanide or a nitroprusside compound (e.g., including, without limitation, a ferricyanide salt, a ferrocyanide salt or a nitroprusside salt), with the aqueous reagent solution feed line further in communication with the treatment line. The system further includes a mixing section in communication with the treatment line, and a first filter including a first filter inlet and a first filter outlet, with the first filter inlet in communication with the mixing section. The system further includes a second filter including a second filter inlet and a second filter outlet, with the second filter inlet in communication with the first filter outlet and the second filter outlet in communication with a return line, with the return line in communication with the aluminum desmutting solution recirculating line.

According to another aspect, the iron cyanide-containing compound includes at least one of a ferricyanide, a ferrocyanide, or a nitroprusside.

According to further aspect, the aluminum desmutting solution comprises a chrome-containing or iron-containing deoxidizing solution.

In another aspect, the aluminum desmutting solution reservoir in communication with or includes an operating aluminum desmutting solution tank.

In another aspect, the portion of the aluminum desmutting solution comprises a flow rate ranging from about 1 gallons/min. to about 50 gallons/min.

In another aspect, the aqueous reagent solution comprises potassium ferricyanide in a concentration of about 20% by weight.

In a further aspect, the aqueous reagent solution is supplied to the mixing section at a flow rate ranging from about 2 gallon per day to about 900 gallons per day of aqueous reagent solution.

In another aspect, the mixing section includes at least one static mixing conduit having at least one integral baffle, with the mixing conduit configured to mix flows passing through the mixing section.

In another aspect, the mixing section includes at least one static mixing conduit having at least one mixing conduit insert, with the insert comprising at least one baffle.

In another aspect, the system is configured to maintain a copper ion concentration in the aluminum desmutting solution in an amount ranging from about 100 ppm to about 475 ppm.

In a further aspect, the first filter comprises a first filter element having an average pore size ranging from about 0.5 to about 1.0 micron.

In another aspect, the second filter comprises a second filter element having an average pore size ranging from about 0.05 to about 0.2 micron.

A further aspect of the present disclosure is directed to a system for treating aluminum, with the system including an aluminum desmutting solution feed line in communication with an aluminum desmutting solution reservoir, with the aluminum desmutting solution feed line configured to deliver a portion of an aluminum desmutting solution from the aluminum desmutting solution reservoir to a recirculating line and an aluminum desmutting solution treatment line, with the aluminum desmutting solution treatment line in downstream communication with the aluminum desmutting recirculating line. The system further includes an aqueous reagent solution feed line in communication with an aqueous reagent solution source, with the aqueous reagent solution including iron cyanide compound (e.g., including an iron cyanide salt), with the aqueous reagent solution feed line further in communication with the treatment line. The system further includes a mixing section in communication with the treatment line and a first filter including a first filter inlet and a first filter outlet, with the first filter inlet in communication with the mixing section. The system further includes a second filter including a second filter inlet and a second filter outlet, with the second filter inlet in communication with the first filter outlet and the second filter outlet in communication with a return line, with the return line in communication with the aluminum desmutting solution recirculating line.

The features, functions and advantages that have been discussed can be achieved independently in various aspects or may be combined in yet other aspects, further details of which can be seen with reference to the following description and the drawings.

BRIEF DESCRIPTION OF THE DRAWINGS

Figure 1:
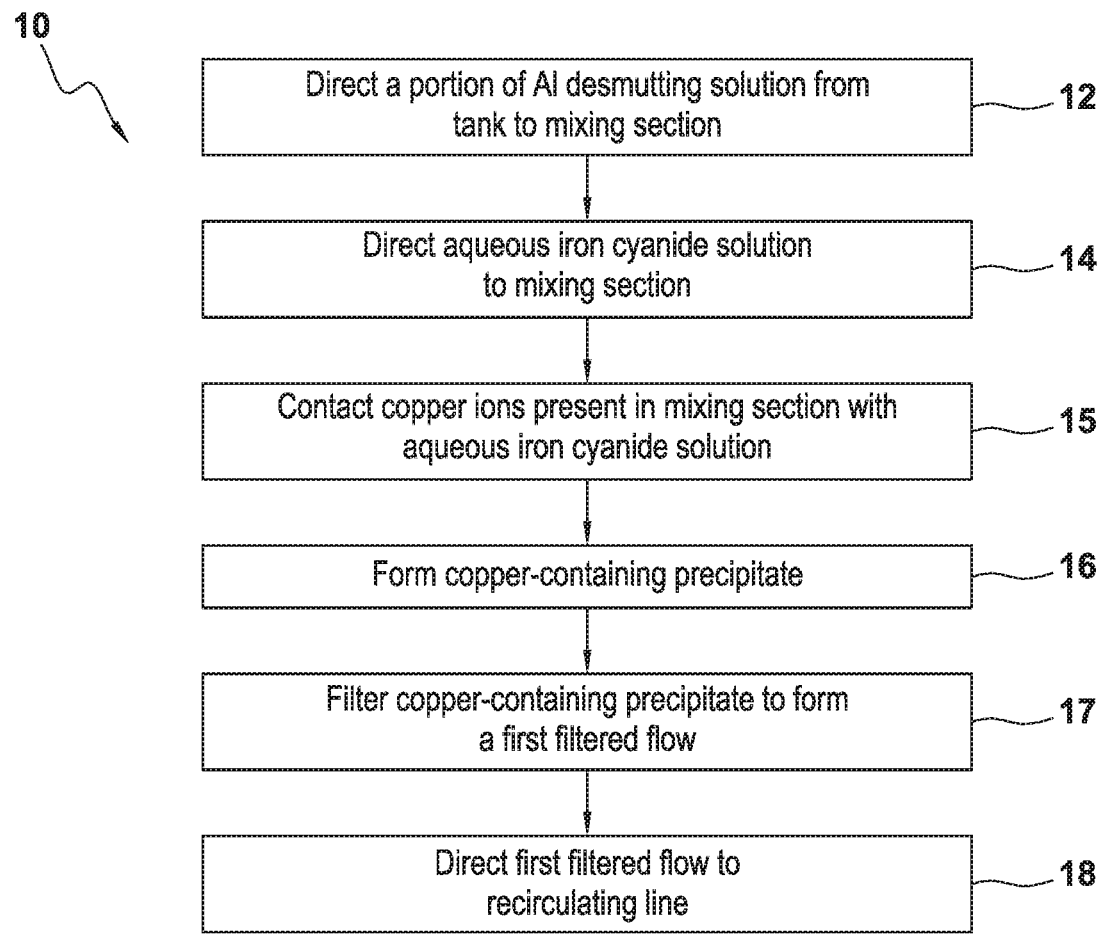
Figure 2:
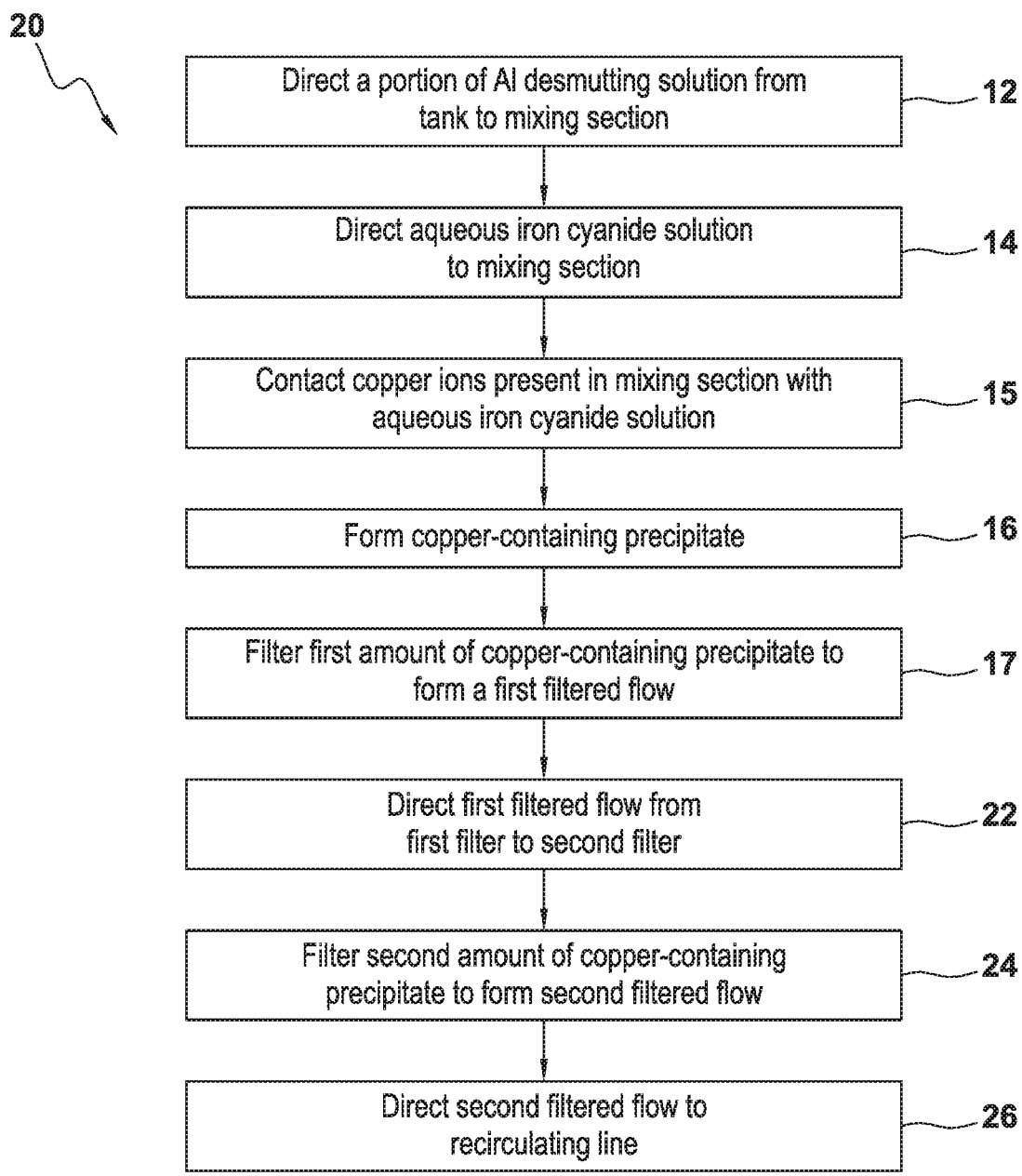
Figure 3:
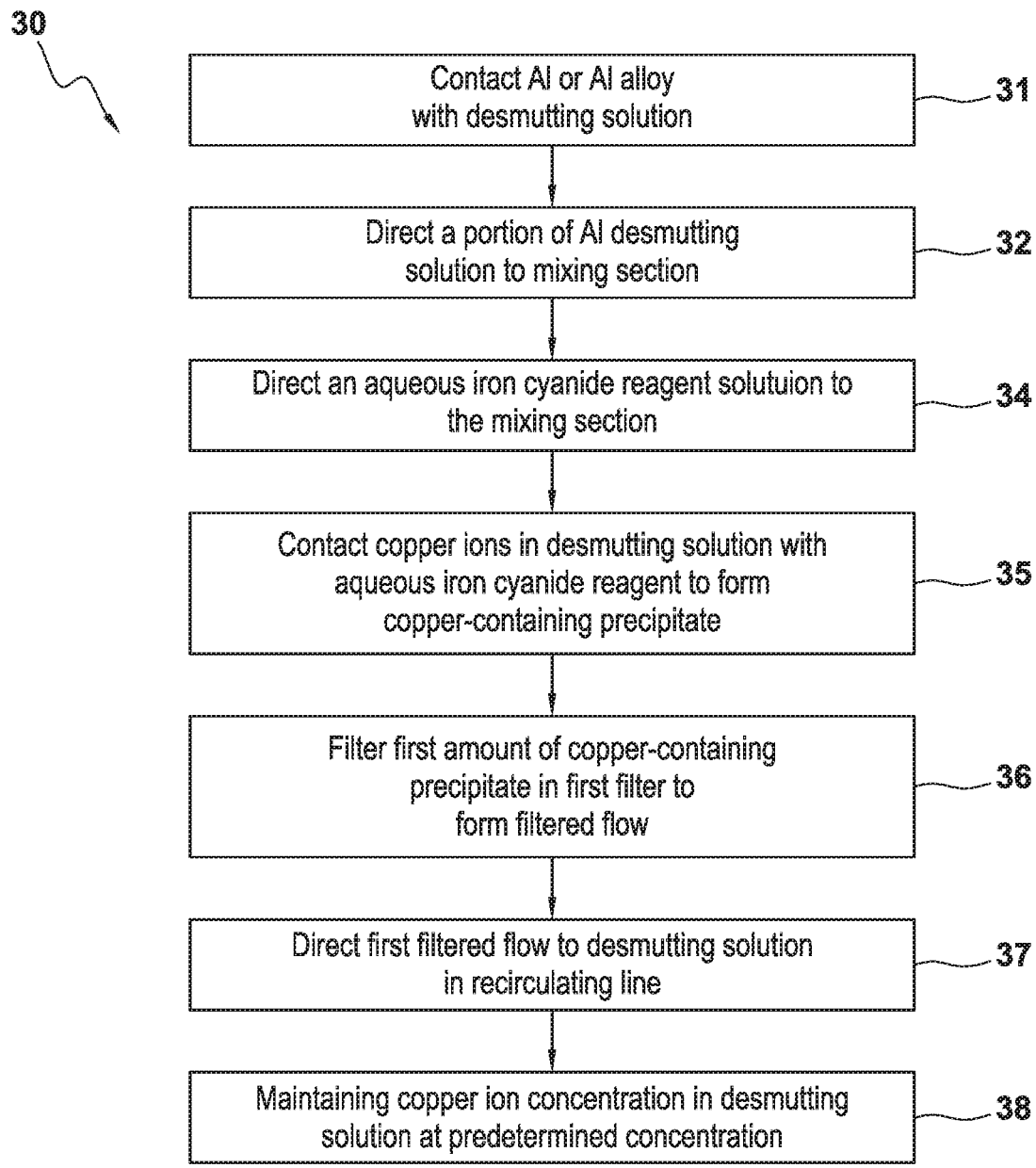
Figure 4:
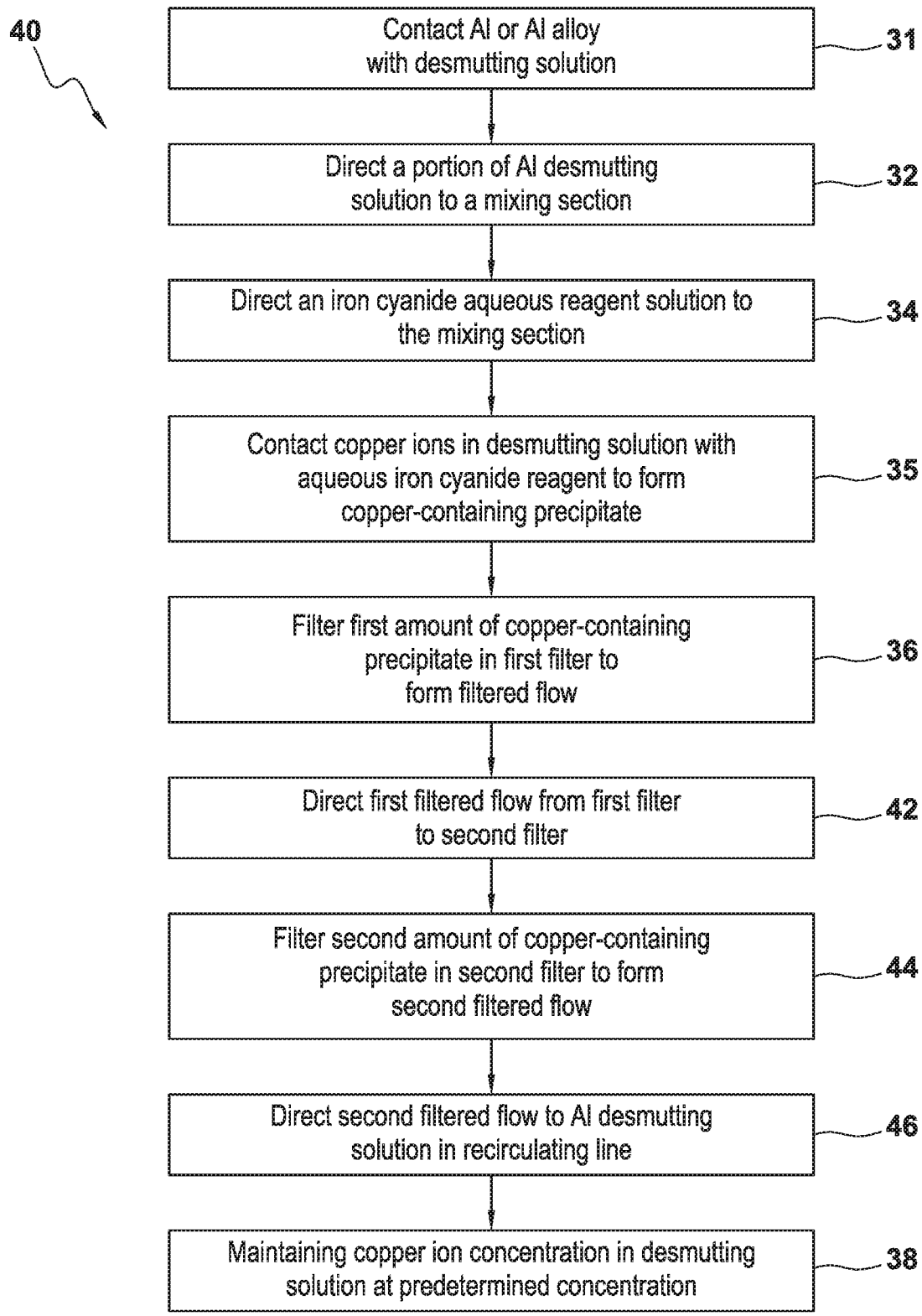
Figure 5:
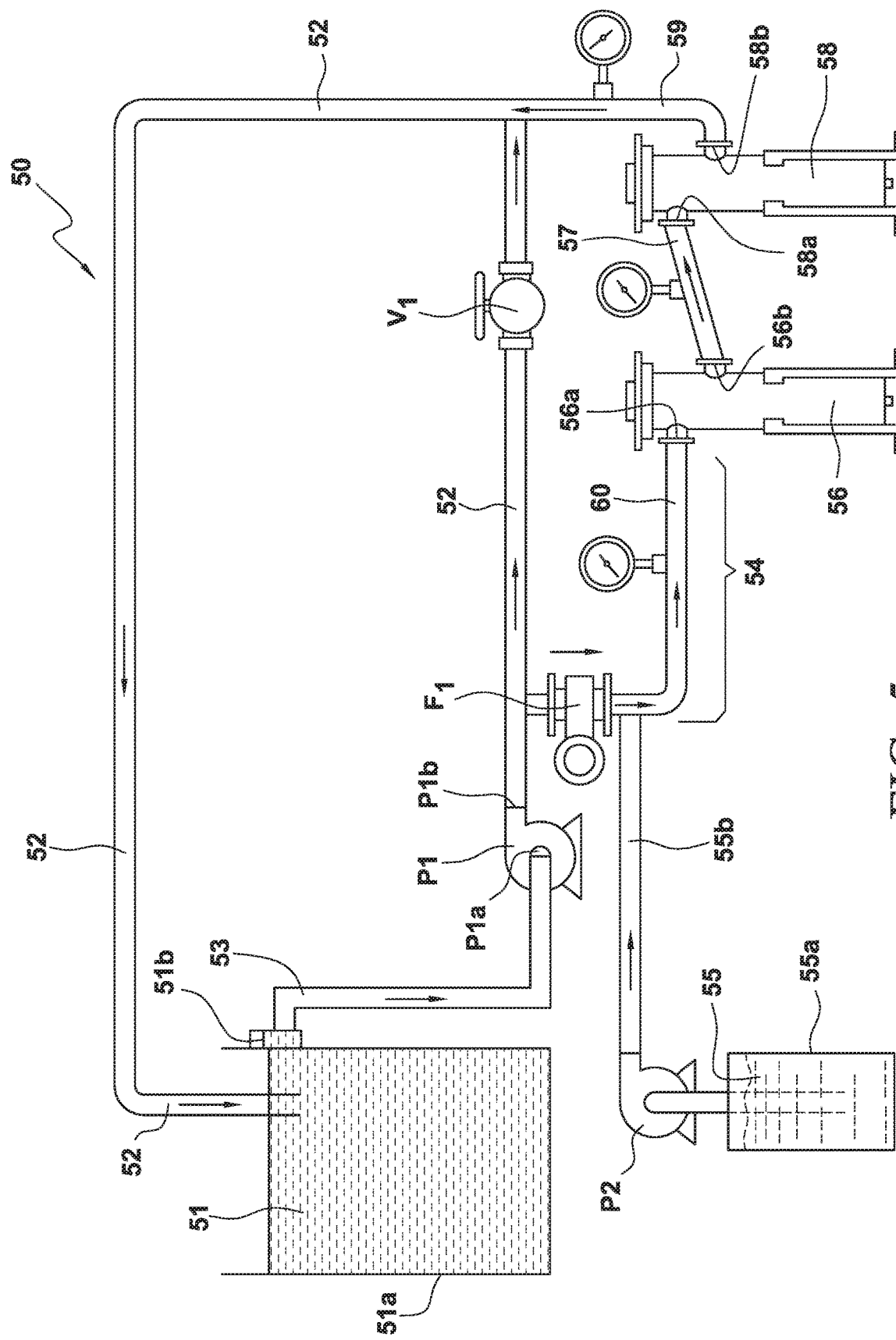

Having thus described variations of the disclosure in general terms, reference will now be made to the accompanying drawings, which are not necessarily drawn to scale, and wherein:

FIG. 1 is a flowchart describing aspects of the present disclosure;

FIG. 2 is a flowchart describing aspects of the present disclosure;

FIG. 3 is a flowchart describing aspects of the present disclosure;

FIG. 4 is a flowchart describing aspects of the present disclosure;

FIG. 5 is a process diagram illustrating aspects of the present disclosure; and

Figure 6:
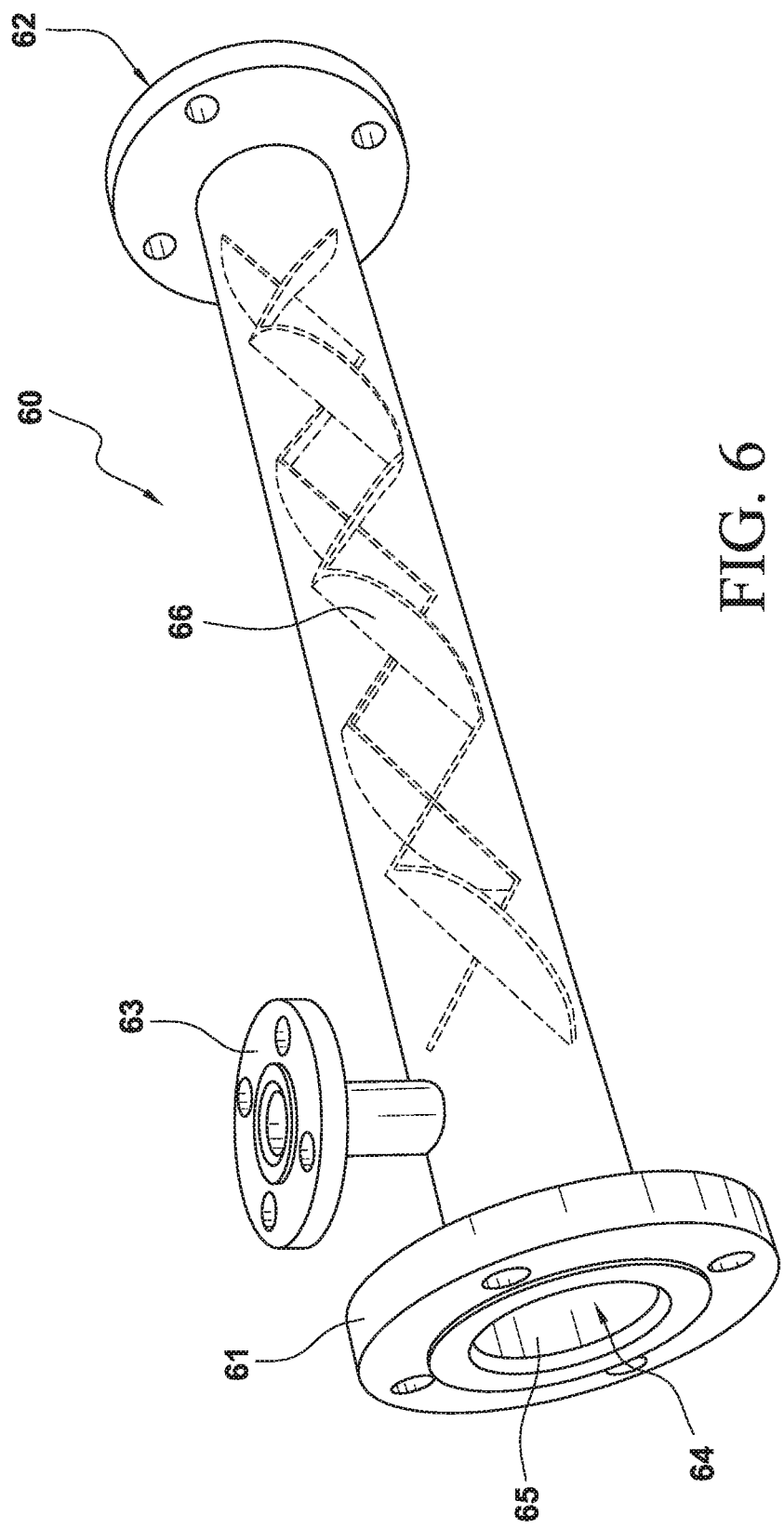

FIG. 6 is a partial cross-sectional view of the mixing conduit in the treatment section, according to aspects of the present disclosure.

DETAILED DESCRIPTION

FIG. 1 is a flowchart describing an aspect of the present disclosure, wherein a method 10 is disclosed comprising directing 12 at least a portion of an aluminum desmutting solution from an operating aluminum desmutting tank to a mixing section. According to aspects of the present disclosure, at least a portion of the desmutting solution is directed from an operating desmutting tank to a mixing section during the active desmutting operation of the aluminum desmutting process. In other words, at least a portion of the desmutting solution is diverted away from the operating desmutting tank for treatment at a treatment section of an aluminum desmutting solution treatment system during an active desmutting operation, without requiring any down time of the overall system. The method further comprises directing 14 an iron cyanide reagent, preferably in aqueous solution form, to the mixing section followed by contacting 15 copper ions from the desmutting solution present in the treatment section with an aqueous iron cyanide reagent solution (e.g, an aqueous potassium ferricyanide solution), and forming 16 a copper-containing precipitate in the mixed desmutting/reagent solution in the mixing section. The method further comprises filtering 17 a first copper-containing precipitate from the mixed solution in a first filter to form a first filtered flow leaving the first filter, and directing 18 the first filtered flow from the first filter to the desmutting solution in the operating desmutting tank via a recirculating line.

FIG. 2 is a flowchart showing an alternate method 20 to that shown in FIG. 1, where additional steps occur after the first filtering step and before directing 18 the filtered flow. After filtering 17 a first amount of copper-containing precipitate in the first filter (as shown in FIG. 1), FIG. 2 shows directing 22 a first filtered flow from the first filter to a second filter, and filtering 24 a second amount of copper-containing precipitate and forming a second filtered flow. The method further comprises directing 26 the second filtered flow from the second filter to the desmutting solution in the operating desmutting tank via a recirculating line.

FIG. 3 is a further variation of aspects of the present disclosure outlined in FIG. 1. FIG. 3 comprises a method 30 for desmutting aluminum comprising contacting 31 aluminum and/or an aluminum alloy with a desmutting solution, and directing 32 at least a portion of the aluminum desmutting solution from a tank to a mixing section. As in the method outlined in FIGS. 1 and 2, FIG. 3 shows at least a portion of the desmutting solution is directed from an operating desmutting tank to a mixing section during the active desmutting operation of aluminum and/or an aluminum alloy. In other words, at least a portion of the desmutting solution is diverted away from the operating desmutting tank for treatment at a mixing section of a desmutting solution treatment system during an active desmutting operation, without requiring any down time of the overall system.

The method outlined in FIG. 3 further comprises directing 34 an aqueous iron cyanide reagent solution to the mixing section followed by contacting 35 copper ions present in the desmutting solution at the treatment section with an aqueous iron cyanide reagent solution to form a copper-containing compound precipitate in the mixed desmutting/reagent solution in the mixing section. The aqueous iron cyanide reagent solution is added to, and then mixed with, the aluminum desmutting solution at a rate to achieve a desired turbulent flow in the mixing section resulting from a combined flow (desmutting solution and aqueous reagent solution) having a flow rate ranging, for example, from about 7 to about 10 gallons/minute (gpm), through a mixing conduit having about a 0.5 inch inner diameter, while adding the aqueous reagent solution at a rate of, for example, about 18 gallons/24 hr. (e.g., 18 gal./day). It is understood that parameters such as flow rates, mixing rates, etc., can be adjusted and tuned by other system parameters including, for example, pressure applied to the system, filtering pore size, filtering rates, internal diameter and other dimensions of the lines, piping, conduits present in the systems, etc.

The method as shown in FIG. 3 further comprises filtering 36 the copper-containing precipitate in a first filter to form a first filtered flow leaving the first filter, and directing 37 the first filtered flow from the first filter to the desmutting solution in the operating desmutting tank via a recirculating line, and maintaining 38 a copper ion concentration in the operating desmutting solution at a predetermined copper ion concentration range, preferably ranging from about 100 ppm to about 475 ppm copper ions.

FIG. 4 is a flowchart showing an alternate method 40 according to aspects of the present disclosure. As in the method shown in FIG. 3, method 40 comprises contacting 31 an aluminum or aluminum alloy with a desmutting solution; directing 32 a portion of aluminum desmutting solution to a mixing section, directing 34 an iron cyanide reagent solution (e.g. an aqueous potassium ferricyanide solution) to the mixing section; contacting 35 copper ions in the desmutting solution with aqueous iron cyanide reagent in the mixing section to form a copper-containing precipitate; and filtering a first amount of copper-containing precipitate in a first filter to form a first filtered flow. As also shown in FIG. 4, the method 40 further comprises directing 42 a first filtered flow from the first filter to a second filter and filtering 44 a second amount of copper-containing precipitate in the second filter and forming a second filtered flow. The method further comprises directing 46 the second filtered flow from the second filter to the desmutting solution in the operating desmutting tank via a recirculating line, and maintaining 38 a copper ion concentration in the desmutting solution at a predetermined copper ion concentration, preferably ranging from about 100 ppm to about 475 ppm, as desired.

According to an aspect of the present disclosure, FIG. 5 is a diagram showing a system 50 for removing copper ions from an aluminum desmutting solution and otherwise maintaining copper ion concentration at a predetermined concentration in an aluminum desmutting solution. As shown in FIG. 5, aluminum desmutting solution 51 containing a concentration of copper ions is contained in an aluminum desmutting solution tank 51a, comprising an aluminum desmutting solution tank outlet 51b in communication with an aluminum desmutting solution feed line 53 that is in communication with an aluminum desmutting solution recirculating line 52. As shown, feed line 53 enters a first pump P1 at first pump inlet P1a and proceeds from first pump outlet P1b. A flow of aluminum desmutting solution 51 is pumped from the aluminum desmutting solution tank 51a first to aluminum desmutting solution feed line 53. A portion of the aluminum desmutting solution in aluminum desmutting solution feed line 53 is then directed/diverted through flowmeter F1 by partially closing control valve V1 in recirculating line 52. This portion of the aluminum desmutting solution is then directed onward to mixing section 54. As also shown in FIG. 5, a reagent solution 55 resides in a reagent solution container 55a and is pumped from reagent solution container 55a to a reagent feed line 55b via second pump P2. Reagent feed line 55b directs a flow of reagent solution 55 to mixing section 54.

As shown in FIG. 5, the portion of aluminum desmutting solution flowing to mixing section 54 mixes with a flow of reagent solution 55 at mixing section 54. Mixing section 54 comprises a mixing section conduit 60, shown in greater detail in FIG. 6 (Koflo, Cary, Ill.). Mixing section 54 as shown in FIG. 5 is in communication with first filter inlet 56a of first filter 56. First filter outlet 56b is in communication with filter line 57. Filter line 57 is also in communication with second filter inlet 58a of second filter 58. Second filter outlet 58b is in communication with return line 59, with return line 59 also in communication with recirculating line 52.

The filters employed and their capacity for filtration will depend upon the precipitates that are chemically induced. According to aspects of the present disclosure, the first filter comprises a membrane having a pore size ranging from about 0.5 micron to about 1.0 micron, and the second filter comprises a membrane having a pore size ranging from about 0.05 micron to about 0.2 micron. According to more specific aspects of the present disclosure, 20 inch filter cartridges with 1 micron absolute rated filters are contemplated for use as the first filter, also referred to as a "pre-filter", in systems similar to those depicted generally in FIG. 5. Further, 20 inch cartridge 0.1 micron absolute rated filters are contemplated, according to aspects of the present disclosure, for use as the second filter, also referred to as a "post filter", in systems similar to those depicted generally in FIG. 5. Among other variables, the reagent solution selected will contribute to the selection of membranes to be used in the filters, and include, without limitation, polytetrafluoroethylene (PTFE) or ethylenechlorotrifluoroethylene (ECTFE) membranes such as those manufactured by GE, Graver and Pall.

The conditions of the combined flow of desmutting solution and reagent solution and their flow rates may be adjusted to allow use filter membranes and filter structural components made from other materials, including, for example and without limitation, polypropylene (PP) membranes. Useful first filters, or pre-filters include, without limitation, GE Memtrex (1 micron absolute PTFE membrane/PP structural components); GE Flowtrex HR (3 micron absolute, ethylenechlorotrifluoroethylene membrane and structural components, Pall Emflon Filter (1 micron absolute, PTFE membrane, PP structural components). Useful second filters, or post filters include, without limitation, GE Memtrex hydrofluoroether (HFE) filters (0.1 micron absolute, PTFE membrane, ECTFE structural components); Graver Citadel filters (0.1 micron absolute, PTFE membrane and construction); Pall Ultikleen-CDS filters (0.1 micron absolute, PTFE membrane and construction), etc.

Aspects of the present disclosure as shown in FIGS. 1-4 contemplate treating a portion of the aluminum desmutting solution that is diverted from an operating aluminum desmutting solution tank or bath to a mixing section to treat the desmutting solution for the purpose of removing a predetermined amount of copper ions from the treated/diverted portion of the aluminum desmutting solution, and thereby significantly lowering the copper concentration of the treated portion of the aluminum desmutting solution by a predetermined amount of, for example, a copper concentration reduction of 300 ppm or more. According to further aspects, the treated portion of the aluminum desmutting solution having a significantly reduced and predetermined amount (e.g., reduced concentration) of copper ions in solution leaves the filtration phase of the system (e.g., the one or more filters) and is returned to the desmutting bath. The continued treatment and return to the diverted portions of the desmutting bath solution during operation of the desmutting bath facilitates a controllable treatment of the desmutting bath for the purpose of reducing copper ion concentration in the desmutting bath, or maintaining a predetermined range of copper-containing ions in the desmutting bath, even while the desmutting bath is fully operational.

Therefore, according to aspects of the present disclosure, the copper ion concentration of the desmutting bath is preferably regulated to comprise a copper ion concentration ranging from about 100 ppm to about 475 ppm copper ions, without the need to cease desmutting operations, and incur processing downtime to treat the desmutting bath. In addition, according to aspects of the present disclosure, the filtered flow of the diverted and treated portions of the desmutting solution preferably comprise a copper ion content ranging from about 30 to about 100 ppm copper ions.

FIG. 6 shows a partial cross-sectional view of mixing section conduit 60 located at the mixing section 54 of system 50. As shown in FIG. 6, mixing section conduit 60 (Koflo, Cary, Ill.) comprises a mixing section conduit inlet 61 that is in communication with mixing section 54 (as shown in FIG. 5). Mixing section conduit outlet 62, as shown in FIG. 5, is in communication with first filter inlet 56a of first filter 56. Mixing section conduit 60 is further shown comprising fitting 63 to which aqueous reagent feed line 55b, as shown in FIG. 5, is in direct communication with the mixing section conduit. As shown in FIG. 6, mixing section conduit 60 further comprises a mixing section conduit pathway 64 bounded by the mixing section conduit inner wall 65 of mixing section conduit 60. Conduit mixing elements 66, as shown in FIG. 6, are in communication with mixing section conduit inner wall 65, and such mixing conduit elements 66 extend along a predetermined length of mixing section conduit inner wall 65 to effect a predetermined amount of mixing of solutions passing through, and causing turbulence within conduit 60 created by such mixing elements 66. As shown in FIG. 6, the mixing section conduit is a static mixer such as, for example, of the type manufactured by Koflo (Cary, Ill.).

An aspect of the present disclosure contemplates a process using the system as illustrated in FIGS. 5 and 6, where an aluminum treatment line comprises the system 50 for the purpose of removing an accumulation of copper ions that develop in the aluminum desmutting solution held in an aluminum desmutting tank. For the purpose of this disclosure, the terms "aluminum desmutting solution tank", "aluminum desmutting solution bath", and "aluminum desmutting reservoir" are equivalent terms with equivalent meaning that can be used interchangeably.

Over time, as aluminum and aluminum alloy workpieces (and/or sheets prior to workpiece formation) in an aluminum treatment process, or "line" are desmutted, the aluminum desmutting solution used to remove oxide layers from the surface of the aluminum and aluminum alloy workpieces will also attack the aluminum/aluminum alloy, resulting in the creation of copper ions leaving the aluminum/aluminum alloy. Such copper ions that are liberated from the aluminum/aluminum alloys exposed to the aluminum desmutting solution will increase in concentration and reside in the desmutting solution, until the solution is unusable.

According to an aspect of the disclosure, to significantly and measurably extend the life of an aluminum desmutting solution, such as according to a predetermined schedule (e.g., based on time or volume of aluminum treated, etc.) or when a particular copper ion concentration is sensed or otherwise determined (e.g., by manual or automatic aliquot or other sampling procedure, etc.) to exceed a desirable level, the system 50 as shown in FIG. 5 may be initiated manually (e.g., on-site or remotely, etc.) or automatically. Therefore, an aspect of the present disclosure further contemplates automatically initiating the system 50 either according to a periodic schedule or when copper ion concentration approaches or surpasses a predetermined concentration, as may be detected by any assaying or metering device. Such device may be in communication with a sensor or other device able to sense and transmit a signal to a signal receiving device responsible for initiating system 50. For example, if such a solution operates optimally with a copper ion concentration of, for example, less than about 500 ppm copper, the system 50 may be initiated at any time as needed to prevent copper smut formation (e.g., when the copper ion concentration approaches about 500 ppm copper ions)

Through the initiation of system 50, during operation of an aluminum desmutting process (i.e., without having to discontinue the aluminum desmutting process) first pump P1 is activated and control valve V1 is partially closed to pump and divert a portion (e.g., a predetermined volume at a predetermined flow rate) of aluminum desmutting solution 51 from tank 51*a* (via tank outlet 51*b*) into aluminum desmutting solution feed line 53 and into mixing section 54. If desired, substantially simultaneously, pump P2 is activated to deliver a predetermined volume of reagent solution 55 at a predetermined reagent flow rate from reagent solution container 55*a* to reagent feed line 55*b*, and into mixing section 54. According to one aspect, the diverted portion/volume of aluminum desmutting solution 51, and the predetermined volume of reagent solution 55 are combined at mixing section 54. The reagent solution will contain compounds that will react with the copper ions in the aluminum desmutting solution and result in a substantially insoluble copper-containing precipitate. The configuration of the internal surfaces of the mixing section conduit 60 will induce a predetermined level of turbulence and achieve a predetermined level (e.g., rate, etc.) of mixing of the desmutting solution flow and the reagent solution flow. Such turbulence is dependent upon various factors including, without limitation, feed line and conduit diameter and/or dimensions, surface characteristics of the internal surfaces of the feed lines and conduit, velocity (e.g., flow rates) of the solutions through the feed lines and conduit, pumping pressure, filtering back pressure, and configuration of the mixing elements provided to and that are otherwise present at the mixing section conduit inner wall.

The predetermined mixing rate may be any rate that insures substantially complete mixing of the desmutting solution flow and the reagent solution flow into a combined flow, and that insures stoichiometric conditions required to achieve formation of a substantially insoluble copper-containing compound or compounds that will readily precipitate out of the combined solution. The combined flow, including an amount of precipitate containing copper-containing compound or compounds, leaves the mixing section conduit in the combined flow and proceeds onward from the mixing section conduit 60 to the first filter inlet 56*a* of a first filter 56. The filtering process may be accomplished via a plurality of filters placed, for example, in series. However, an aspect of the present disclosure contemplates filtering accomplished in a single filter or in, for example, a single, but multi-staged filter, any practical plurality of single or multi-staged filters, etc.

As shown in FIG. 5, the combined flow proceeds from the mixing section conduit and into the first filter, with the first filter having a pore size commensurate with, and dependent upon, for example, the composition of the preselected reagent solution, and the preselected composition of the copper-containing compounds that precipitate from the combined flow, etc. The pore sizes of the first and second filter may be the same or different, with an aspect of the present disclosure contemplating a first filter pore size ranging from about 0.5 micron to about 1 micron, and the second filter pore size ranging from about 0.05 micron to about 0.2 micron. A first filtered flow then proceeds from the first filter outlet 56*b* of first filter 56 and into filter line 57. The once-filtered combined flow is then directed via the filter line 57 into the second filter inlet 58*a* of second filter 58. The second-filtered flow then proceeds from the second filter 58 via the second filter outlet 58*b* and into return line 59 and then into recirculating line 52, through which the now twice-filtered aluminum desmutting solution returns to the aluminum desmutting solution tank 51*a*.

Aspects of the disclosed systems and methods, such as those illustrated in the FIGs., further contemplate that such systems and methods may require the system to be run under a pressure that is adequate to draw and direct a flow of aluminum desmutting solution and a flow of reagent solution across the various stages of the system. Therefore the pressure placed on the system from one or more pumps must be adequate to deliver the desmutting and reagent solutions to the mixing section and, along with the internal features of the mixing conduit at the mixing section, produce a degree of turbulence within the mixing section to insure a predetermined level of mixing of the reagent solution with the diverted portion/volume of the desmutting solution. The turbulence produced within the mixing section serves to facilitate the reaction and sequestration of a predetermined amount of the copper ions present in the desmutting solution with the reagent solution to produce the copper-containing precipitate. If an iron cyanide-containing reagent solution is used, it is further contemplated that substantially all of the cyanide-containing precipitate will also be filtered from the combined solution at the filtering stages. For purposes of the present disclosure, with respect to the filtering of a cyanide-containing precipitate, the term "substantially all" is equivalent to a percentage of cyanide-containing compound precipitate removal ranging from about 99.5% to 100% removal.

The mixing section comprises a conduit section that incorporates features designed to impart a predetermined level and degree of turbulence on fluids flowing through the mixing section. According to aspects of the present disclosure, a static mixing conduit exemplified in FIG. 6 offers one means for agitating the combined through-flowing solutions. However, the mixing section may incorporate or otherwise comprise added and/or alternative mixing features, such as, for example, inserts that may be fixed or retained, preferably in a substantially stationary orientation within the mixing section conduit. Inserts may contain any number of baffles or other features, for the purpose of causing a predetermined degree or level of turbulence and mixing to a through flow of liquid or combined liquid flows.

The mixing of the solutions caused by the turbulence in the mixing section is an important aspect. It was determined that mere addition of an iron cyanide reagent solution to the desmutting (ALDOX V) solution without mixing the solutions with adequate turbulence did not cause the desired reduction of copper ions in the desmutting solution. See Example 5 below. Therefore the presence of the static mixer in the mixing section according to aspects of methods and systems disclosed is provided to the system to facilitate desired copper ion removal from the desmutting solution.

The pressures required for the present systems depend upon variables including, without limitation: the internal diameters of the lines, pipes, conduits etc. in the system; the flow rate to be maintained to achieve a predetermined degree of turbulence in the mixing section; the amount of back-pressure produced by, as well as the pressure required by the filtering stages etc. Therefore, and by way of a non-limiting example, according to one contemplated aspect, when the internal diameter of all system lines is approximately ½", and two one-stage filters are in the system line (with each filter stage requiring up to 20 psi to operate), a system pressure of at least about 50 psi would be required to insure solution flow rates through the system ranging from about 1 gallon per minute (gpm) to about 50 gpm.

According to a further aspect, combined flowrates ranging from about 1 gpm to about 2,800 gpm (based on a flow rate of 1 foot per second (fps) through a 0.5 inch diameter mixing section, up to 8 fps through a 12 inch diameter mixing section could be achieved, assuming adequate pumping and pressures were provided to the system. For this example, the flowrate of the iron cyanide reagent solution would be set for 2 gallon per day for a 1 gallon per minute (gpm) combined flow rate; 100 gallons per day of reagent solution for a 50 gpm combined flow rate; 5600 gallons per day of reagent solution for a combined flow rate for a 2800 gallon per minute (gpm), etc.

According to an aspect of the present disclosure, the aluminum desmutting solution is a chromate or non-chromate-containing composition that will not corrode aluminum and that possesses good aluminum and aluminum alloy desmutting properties. Contemplated desmutting solutions comprise solid compounds or liquid concentrates that are diluted in water to form aqueous acid desmutting solutions that contain deoxidizing hydrogen ions and ferric ions in specified ratios with the hydrogen ion believed (without being bound to a particular theory) to be the primary ingredient causing the removal of smut from aluminum and aluminum alloys, primarily through the formation of water-soluble salts. However, the ferric ions are thought to also contribute to smut removal from an aluminum surface.

The pH of the acidic desmutting solution is preferably monitored and substantially maintained in the range of from about 0.5 to about 1.5. It is understood that additional buffers and reagents are periodically added to the desmutting solution to adjust pH or replenish or adjust any other solution properties, and to generally prolong the life of the desmutting solution such that the desmutting operation, in conjunction with the removal of copper from the desmutting solution using the processes presently described herein, facilitate a substantially continuously operating desmutting operation in conjunction with or separately from an aluminum treatment line. In this way, the useful life of a desmutting bath solution is significantly extended (up to three times or more) for desmutting solution/bath regimens used in the treatment of aluminum and aluminum alloys. Importantly, not only is the desmutting bath solution life extended significantly, but the desmutting solution/bath is treated, replenished etc., while the desmutting process continues to be conducted and is in operation (i.e., without shutting down or otherwise interrupting operation of the aluminum desmutting process).

Certain preferred desmutting solutions contemplated herein comprise a ferric ion concentration ranging from about 2 to 17 grams/liter or more, with the ratio of hydrogen ion to ferric ion preferably ranging from about 0.03 to about 0.036. For example, at a ratio of about 0.03, aluminum desmutting at 75° F. will occur in about 10 mins, while a ratio of 0.36 will yield aluminum desmutting in from about 0.5 to about 2 mins. A significantly lower hydrogen to ferric ion ratio of about 0.006 will increase the time required to achieve adequate desmutting to about 30 minutes, which may be impractically slow for an efficient aluminum desmutting treatment line.

Further aluminum desmutting solutions thought to be treated according to aspects of the present disclosure include chrome-containing and/or iron-containing deoxidizing solutions, including deoxidizing solutions comprising a ferric ion content of about 8 grams/liter with a ratio of hydrogen to ferric ion of about 0.084. It is understood that the desmutting solutions also may comprise nitric acid, iron sulfate, chromic acid, sulfuric acid and hydrofluoric acid. Such deoxidizing solutions used as desmutting solutions having such content and ratios are available as ALDOX V solutions and include, for example, those solutions commercially available under the tradename BONDERITE C-IC® Deoxidizer 6MU ALDOX V Aero.

It is further understood that, to remove smut from certain aluminum alloys, certain other components must be present in certain amounts in the desmutting solutions. For example, to desmut alloy 6061, a minimum fluoride ion concentration may be required due to inclusion of amounts of silicon in the alloy. The desmutting solution treatments disclosed herein are understood to facilitate maintaining copper ion concentration at acceptable levels in the desmutting treatment solutions commonly used in aluminum processing and treatment. Such acceptable levels may comprise copper ion concentrations below about 500 ppm. As stated above, maintaining such copper ion concentrations below about 500 ppm will enable an aluminum desmutting bath to have its useful life on the production and treatment line prolonged more than 3 to 4 times longer as compared to the useful life of such desmutting baths that are not treated according to aspects of the present disclosure (e.g., 3× to 4× longer or more as compared to the time at which aluminum desmutting bath depletion and replacement would ordinarily occur).

Such replacement of a "spent" desmutting solution from large tanks in conjunction with, or separate from, an aluminum processing line requires production to cease, as the "spent" desmutting bath is replaced with a fresh desmutting bath. Solution replacement and solution replenishment processes result in a processing interruption of several days up to several weeks. In strong contrast, aspects of the present disclosure facilitate a substantially uninterrupted aluminum desmutting operation, as the copper ion concentration is monitored, maintained and effectively restricted to a level where desmutting solution replacement is not required.

The reagent solutions useful according to aspects of the present disclosure comprise iron cyanides including ferricyanides, ferrocyanides, and nitroprussides. Ferricyanides ($[Fe(CN)_6]^{3-}$) and ferrocyanides ($[Fe(CN)_6]^{4-} \rightleftharpoons [Fe(CN)_6]^{3-} + e^-$) of any soluble salts of alkali metals may be used, with potassium and sodium salts being preferably used to make reagent solutions having a useful concentration up to the their solubility in water (e.g., a concentration ranging from about 5% to about 25% by weight, with a 20% by weight solution being preferred).

Nitroprusside ($[Fe(CN)_5(NO)]^{2-}$) solutions made from any soluble salt form are contemplated, with sodium salts preferred based on cost and availability. However, potassium, ammonium, lithium, calcium, barium, selenium, magnesium zinc, cobalt and lead nitroprussides can be used to make reagent solutions having a useful concentration up to the their solubility in water (e.g., a concentration of ranging from about 5% to about 25% by weight, with a 20% by weight solution being preferred).

While not being bound by any particular theory, combining the reagent flow with the diverted portion/flow of aluminum desmutting solution in the mixing section serves to sequester the copper ions in the desmutting solution by forming copper-containing compounds, including copper cyanides that readily precipitate out of the combined reagent/desmutting solution at the mixing section. Such precipitates are then filtered from the combined solution by the filters, with the combined solution having a copper ion concentration that is significantly reduced as compared to the copper ion concentration of the desmutting solution delivered to the system for treatment.

The reagent solution prevents or substantially reduces copper deposition (e.g., in the form of smut) onto a surface of an aluminum workpiece being treated in a desmutting bath in a manner such that any desired desmutting or deoxidizing is not substantially interfered with. Amounts of copper generated during the aluminum desmutting will depend on variables including, for example, and without limitation, the amount of copper present in the aluminum alloy being desmutted, the conditions of any alkaline etching of the aluminum, the condition and concentration of the deoxidizing and desmutting baths present along the aluminum treatment processing line, the amount of surface area of aluminum processed in a certain period of time, etc.

The actual concentration of the reagent solution may vary, so long as the upper solubility limit of the ferricyanide, ferrocyanide, or nitroprusside reagent selected is not exceeded; a condition that would cause the reagent to precipitate from solution, adding to the overall amount of precipitate that would need to be filtered prior to returning the treated and filtered desmutting solution to the recycling line and back to the desmutting solution in the desmutting tank. The concentration of the reagent is therefore set at about the concentration required to sequester a predetermined amount of the copper ions expected to be generated in the desmutting solution during aluminum desmutting operations. For example, while even low concentrations of reagent solution will exhibit a beneficial sequestering effect, a preferred concentration of at least about 0.34 g of ferricyanide/ferrocyanide for each 0.1 gram of copper is contemplated by aspects of the present disclosure.

As shown below in Tables 1 and 2, treatment of diverted or directed portions of a copper ion-containing desmutting solution with the iron cyanide reagent solution, followed by a predetermined amount of mixing and filtering, yields a treated aluminum desmutting solution having a copper concentration that can be regulated to exit the treatment system as a filtered flow having a copper ion concentration of from about 30 to about 300 ppm as desired, and more preferably from about 30 to about 100 ppm. In this way, through recirculation and treatment of the aluminum desmutting solution, according to aspects of the present disclosure, by treating a diverted flow of a portion of the desmutting solution, even during operation of the desmutting tank, the copper ion concentration of the entire aluminum desmutting bath can be maintained at a desired concentration of copper ions, and is preferably maintained such that the desmutting bath does not exceed 500 ppm copper ions, preferably ranges from about 100 ppm to about 475 ppm, and more preferably is maintained at less than about 300 ppm copper ions, or as desired.

The lines, pipes, conduits, pumps, etc. that together comprise the systems and apparatuses presented in this disclosure may be made from any material capable of withstanding, without degradation, prolonged exposure to the acidic conditions of the aluminum desmutting solution having an acidic pH ranging from about 0.5 to about 1.5. Suitable materials include, for example, Type 316 stainless steel, polytetrafluoroethylene, polyvinylidene fluoride, etc., with pathways having an internal flow diameter as needed to achieve a predetermined flow rate, system pressure, and mix rate that achieves the desired concentration range of copper ions to be maintained in the freshly-treated portions of desmutting solution exiting the treatment system (filtering stage), as well as the desired concentration range of copper ions to be maintained in the desmutting tank to which the treated portions of desmutting solution are returned.

Example 1

Ferricyanide Reagent Solution

A 20% by weight potassium ferricyanide reagent solution was prepared by dissolving 125 g of potassium ferricyanide (Fisher potassium ferricyanide–Fisher Chemical<0.01% chloride) in 500 ml of deionized water. An amount of 0.9 ml of the 20% by weight potassium ferricyanide reagent solution was mixed with a 100 ml sample of ALDOX V desmutting solution having a copper ion concentration of greater than 350 ppm (BONDERITE C-IC® ALDOX V Aero, Henkel Corporation, 32100 Stephenson Highway, Madison Heights, Mich.). The combined solution was mixed vigorously by hand with a glass rod for 10 seconds. The combined solution was then delivered through a filter media using a Buchner funnel, and the precipitate removed from the solution. The filtering media was a pre-wetted Whatman Nuclepore 0.1 micron filter paper (under vacuum). Visual inspection of the filtered combined solution after 24 hours revealed no further precipitate. Copper concentration in the ALDOX V solution before and after reaction with the 20% by weight potassium ferricyanide solution reagent was measured with an inductively coupled plasma (ICP) mass spectrometer, with the results shown in Table 1. As shown in Table 1, the copper ion content of the ALDOX V desmutting solution was reduced by more than 300 ppm. The filtering of the formed precipitate further successfully removed cyanide from the combined, filtered solution, with results shown in Table 2.

TABLE 1

| Test Run # | Untreated ALDOX V, ppm Copper (from ICP) | Mixing Time (sec.) | Combined Mix Reaction time (mins.) | Final Copper concentration (ppm) after Filtration | Amount of Copper (ppm) removed |
|---|---|---|---|---|---|
| 1 | 384.5 | 10 | 17 | 36.54 | 347.96 |
| 2 | 351.1 | 10 | 13 | 29.66 | 321.44 |

TABLE 2

| | Test 1 | Test 2 |
|---|---|---|
| $CN^-$ conc. of ALDOX V + KFeCN (Mixed Solution) $CN^-$ conc (After Filtration) | Total CN = 300RL 30 Amenable CN = 210 RL30 Total CN = Not Detected RL 3 Amenable. CN = Not Detected RL 3 | Total CN = 17.3 RL 0.5 Amenable CN - 17.3 RL 0.5 Total CN = Not Detected RL 0.005 Amenable CN = Not Detected RL 0.005 |

Example 2

Ferrocyanide Reagent Solution

A 20% by weight potassium ferrocyanide reagent solution is prepared by dissolving 125 g of potassium ferrocyanide, in 500 ml of deionized water. An amount of 0.9 ml of 20% potassium ferrocyanide solution is mixed to a 100 ml sample of ALDOX V desmutting solution having a copper ion concentration of greater than 350 ppm (BONDERITE C-IC® ALDOX V Aero, Henkel Corporation, 32100 Stephenson Highway, Madison Heights, Mich.). The combined solution is mixed vigorously by hand with a glass rod for 10 seconds. The combined solution is then delivered through a filter media using a Buchner funnel. The filtering media is a pre-wetted Whatman Nuclepore 0.1 micron filter paper (under vacuum). The precipitate is removed and visual inspection of the filtered combined solution after 24 hours revealed no further precipitate. Copper concentration in the ALDOX V before and after reaction with the 20% potassium ferrocyanide solution reagent is measured with an inductively coupled plasma (ICP) mass spectrometer.

Example 3

Nitroprusside Reagent Solution

A 20% by weight sodium nitroprusside reagent solution is prepared by dissolving 125 g of sodium nitroprusside in 500 ml of deionized water. An amount of 0.9 ml of 20% sodium nitroprusside solution is mixed to a 100 ml sample of ALDOX V desmutting solution having a copper ion concentration of greater than 350 ppm. (BONDERITE C-IC ALDOX V Aero, Henkel Corporation 32100 Stephenson Highway, Madison Heights, Mich.). The combined solution is mixed vigorously by hand with a glass rod for 10 seconds. The combined solution is then delivered through a filter media using a Buchner funnel. The filtering media is a pre-wetted Whatman Nuclepore 0.1 micron filter paper (under vacuum). The precipitate is removed and visual inspection of the filtered combined solution after 24 hours revealed no further precipitate. Copper concentration in the ALDOX V before and after reaction with the 20% sodium nitroprusside solution reagent is measured with an inductively coupled plasma (ICP) mass spectrometer.

Example 4

The effect of the inadequate mixing of a ferricyanide reagent solution on a desmutting solution was conducted. Notably, testing was conducted without agitation/turbulence/mixing. A 0.9 ml aliquot of a 20% by weight potassium ferricyanide solution was added to a 100 ml sample of ALDOX V desmutting solution comprising a copper ion concentration of 384.5 ppm copper ions (BONDERITE C-IC® ALDOX V Aero, Henkel Corporation, 32100 Stephenson Highway, Madison Heights, Mich.). The 0.9 ml of potassium cyanide solution was the amount determined in Example 1 to remove about 300 ppm copper ions from the desmutting solution. However, without agitation (e.g., vigorous stirring) the potassium ferricyanide solution appeared immiscible and floated on top of the ALDOX V solution (e.g., did not intermix). The mixture was left overnight. Upon testing, it was determined that the copper ion content of the solution was 183.2 ppm copper ions; well in excess of the 36.54 ppm copper achieved with agitation, and as reported above in Example 1 (at Table 1).

Further, aspects of the present disclosure contemplate the use of the aluminum desmutting solutions for the treatment of aluminum and aluminum alloy parts and components, including parts and components used, for example, in the construction of stationary structures including, without limitation, buildings, structural supports, bridges, trusses, etc.

Further aspects of the present disclosure contemplate the use of aluminum desmutting solutions for treating aluminum and aluminum alloy parts and components used to manufacture structural and other components for vehicles including, without limitation, aircraft (e.g. spars, ribs, stringers, skins etc.). Vehicles further include, without limitation, manned aircraft, unmanned aircraft, manned spacecraft, unmanned spacecraft, manned rotorcraft, unmanned rotorcraft, satellites, rockets, missiles, manned terrestrial vehicles, unmanned terrestrial vehicles, manned surface water borne vehicles, unmanned surface water borne vehicles, manned sub-surface water borne vehicles, unmanned sub-surface water borne vehicles, and combinations thereof.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of desmutting an aluminum workpiece comprising:
   contacting the aluminum workpiece with an acidic aluminum desmutting solution, said acidic aluminum desmutting solution maintained at a pH ranging from about 1.0 to about 1.5;
   directing at least a portion of an aluminum desmutting solution from an aluminum desmutting solution feed line directly to a mixing section during a substantially continuous operation of an aluminum desmutting process;
   directing a flow of an aqueous reagent solution to the mixing section, said aqueous reagent solution comprising an iron cyanide compound;
   contacting copper ions present in the portion of the acidic aluminum desmutting solution with the aqueous reagent solution to form a copper-containing precipitate in the mixing section;
   filtering the copper-containing precipitate to form a filtered flow;
   directing the filtered flow to a recirculating line via a filtered flow line;
   forming a copper ion concentration in the filtered flow ranging from about 30 ppm to about 100 ppm; and
   maintaining a copper concentration in the acidic aluminum desmutting solution at a copper concentration ranging from about 100 ppm copper to about 475 ppm during the substantially continuous operation of an aluminum desmutting process.

2. The method of claim 1, wherein, in the step of directing at least a portion of the acidic aluminum desmutting solution, the portion of the aluminum desmutting solution comprises a flow rate ranging from about 1 gallons/min. to about 50 gallons/min.

3. The method of claim 1, wherein, in the step of directing a flow of an aqueous reagent solution to the mixing section, the iron cyanide compound selected from the group consisting of: a ferricyanide; a ferrocyanide; a nitroprusside; and combinations thereof.

4. The method of claim 1, wherein, in the step of directing a flow of an aqueous reagent solution to the mixing section, the iron cyanide compound is selected from the group consisting of: potassium ferricyanide; potassium ferrocyanide; sodium ferricyanide; sodium ferrocyanide; potassium nitroprusside; sodium nitroprusside; and combinations thereof.

5. The method of claim 1, wherein, in the step of directing a flow of an aqueous reagent solution to the mixing section, the aqueous reagent solution concentration ranging from about 5% by weight to about 25% by weight.

6. The method of claim 1, wherein in the step of directing a flow of an aqueous reagent solution to the mixing section, the reagent comprises potassium ferricyanide in a concentration of about 20% by weight.

7. The method of claim 1, wherein in the step of contacting copper ions present in the acidic aluminum desmutting solution with the aqueous reagent solution to form a precipitate, the aqueous reagent solution is supplied to the aluminum desmutting solution at a mixing rate ranging from about 2 gallons per day to about 900 gallons per day of aqueous reagent combined with the aluminum desmutting solution.

8. The method of claim 1, wherein the at least a portion of the aluminum desmutting solution is directed from the aluminum desmutting solution tank to the mixing section during substantially continuous active desmutting operation of the aluminum desmutting solution tank, and wherein the recirculating line returns the filtered flow to the aluminum desmutting solution tank during the substantially continuous active desmutting operation of the aluminum desmutting solution tank.

9. A method of treating an aluminum desmutting solution, the method comprising the steps of:
   directing at least a portion of an aluminum desmutting solution from an aluminum desmutting solution tank to an aluminum desmutting solution feed line;
   directing at least a diverted portion of the aluminum desmutting solution directly from the desmutting solution feed line to a mixing section, said aluminum desmutting solution maintained at a pH ranging from about 1.0 to about 1.5;
   automatically directing an aqueous reagent solution from an aqueous reagent solution feed line to the mixing section when a copper ion concentration in the aluminum desmutting solution surpasses a predetermined concentration, said aqueous reagent solution comprising an iron cyanide compound;
   contacting copper ions present in the aluminum desmutting solution with the aqueous reagent solution at the mixing section to form a precipitate, said precipitate comprising a copper-containing compound;
   filtering the precipitate to form a first filtered flow; and
   directing the first filtered flow to a recirculating line, said recirculating line in direct communication with the aluminum desmutting solution tank;
   wherein the at least a portion of the aluminum desmutting solution is directed from the aluminum desmutting solution tank to the mixing section during substantially continuous active desmutting operation of the aluminum desmutting solution tank;
   wherein the recirculating line returns the filtered flow to the aluminum desmutting solution tank during the substantially continuous active desmutting operation of the aluminum desmutting solution tank;
   forming a treated aluminum desmutting solution in a desmutting bath; and
   maintaining a copper concentration in the aluminum desmutting solution at a copper concentration ranging from about 100 ppm copper to about 475 ppm.

10. The method of claim 9, wherein, in the step of directing at least a portion of the acidic aluminum desmutting solution, the portion of the acidic aluminum desmutting solution comprises a flow rate ranging from about 1 gallons/min. to about 50 gallons/min.

11. The method of claim 9, wherein, in the step of directing an aqueous reagent solution, the iron cyanide compound selected from the group consisting of: a ferricyanide; a ferrocyanide; a nitroprusside; and combinations thereof.

12. The method of claim 9, wherein, in the step of directing an aqueous reagent solution, the iron cyanide compound is selected from the group consisting of: potassium ferricyanide; potassium ferrocyanide; sodium ferricyanide; sodium ferrocyanide; potassium nitroprusside; sodium nitroprusside; and combinations thereof.

13. The method of claim 9, wherein, in the step of directing an aqueous reagent solution comprises, the aqueous reagent solution concentration ranging from about 5% by weight to about 25% by weight.

14. The method of claim 9, wherein in the step of directing an aqueous reagent solution comprises, the reagent comprises potassium ferricyanide in a concentration of about 20% by weight.

15. The method of claim 9, wherein in the step of contacting copper ions present in the acidic aluminum desmutting solution with the aqueous reagent solution to form a precipitate, the aqueous reagent solution is supplied to the acidic aluminum desmutting solution at a mixing rate ranging from about 2 gallons per day to about 900 gallons per day.

16. The method of claim 9, wherein, after the step of filtering the precipitate to form a filtered flow, further comprising:
   directing the first filtered flow from a first filter outlet to a filter inlet of a second filter;
   separating a further amount of precipitate in the second filter from the first filtered flow to form a second filtered flow; and
   directing the second filtered flow from the second filter outlet to the recirculating line.

17. The method of claim 16, wherein, in the step of separating a further amount of precipitate in the second filter, the second filtered flow comprising a copper ion concentration ranging from about 30 ppm to about 100 ppm.

18. The method of claim 9, wherein, in the step of contacting copper ions present in the acidic aluminum desmutting solution with the aqueous reagent solution at the mixing section, said mixing section comprises at least one static mixing conduit, said static mixing conduit comprising at least one baffle.

19. The method of claim 9, wherein the recirculating line returns the filtered flow to the aluminum desmutting solution tank aluminum desmutting solution at a flow rate ranging from about 1 gallons/min. to about 50 gallons/min.

20. The method of claim 9, wherein the aqueous reagent solution comprises potassium ferricyanide in a concentration of about 20% by weight.

\* \* \* \* \*